(12) United States Patent
Böhme et al.

(10) Patent No.: US 12,551,309 B2
(45) Date of Patent: Feb. 17, 2026

(54) SLIT PROJECTOR ARRANGEMENT

(71) Applicant: Carl Zeiss Meditec AG, Jena (DE)

(72) Inventors: Beate Böhme, Großpürschütz (DE); Gerard Antkowiak, Jena (DE); Dietmar Steinmetz, Bucha (DE); Jens Kühnemund, Kleinbockedra (DE); Karsten Festag, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 645 days.

(21) Appl. No.: 17/641,413

(22) PCT Filed: Sep. 8, 2020

(86) PCT No.: PCT/EP2020/075031
§ 371 (c)(1),
(2) Date: Mar. 8, 2022

(87) PCT Pub. No.: WO2021/048098
PCT Pub. Date: Mar. 18, 2021

(65) Prior Publication Data
US 2022/0331042 A1    Oct. 20, 2022

(30) Foreign Application Priority Data

Sep. 10, 2019 (DE) .................... 10 2019 213 706.7
Dec. 6, 2019 (DE) .................... 10 2019 219 120.7

(51) Int. Cl.
*A61B 50/20* (2016.01)
*A61B 3/00* (2006.01)
*A61B 3/135* (2006.01)

(52) U.S. Cl.
CPC ............ *A61B 50/20* (2016.02); *A61B 3/0008* (2013.01); *A61B 3/0016* (2013.01); *A61B 3/135* (2013.01)

(58) Field of Classification Search
CPC ..... A61B 50/20; A61B 3/0008; A61B 3/0016; A61B 3/135
(Continued)

(56) References Cited

U.S. PATENT DOCUMENTS 4,171,877 A * 10/1979 Karasawa ............... A61B 3/135
396/18
5,258,787 A * 11/1993 Ito .......................... A61B 3/135
351/205
(Continued)

FOREIGN PATENT DOCUMENTS

DE      3151837 A1   10/1982
DE  102009036913 A1   2/2011
(Continued)

OTHER PUBLICATIONS

International Search Report for PCT/EP2020/075031, mailed Jan. 18, 2021, 5 pages.
(Continued)

*Primary Examiner* — Balram T Parbadia
*Assistant Examiner* — Rahman Abdur
(74) *Attorney, Agent, or Firm* — DeWitt LLP

(57) ABSTRACT

A slit projector for generating slit illumination in an eye, including a light source, a slit forming unit and an imaging optical unit along a beam path. The invention facilitates improved freedom to operate in the treatment field. The slit projector includes a mirror arranged between the slit forming unit and the imaging optical unit. A corresponding positioning apparatus facilitates aligning the slit illumination in the eye for a therapy system with a surgical microscope and a slit projector. The positioning apparatus includes a holding element and a fastening element, which can be connected to the surgical microscope and the slit projector, respectively, and a pivoting element including a first con-
(Continued)

nection, by use of which the pivoting element and the holding element are movably connected, and a second connection, by use of which the pivoting element and the fastening element are movably connected.

18 Claims, 10 Drawing Sheets

(58) Field of Classification Search
USPC .......................................................... 351/214
See application file for complete search history.

(56) References Cited

U.S. PATENT DOCUMENTS

| | | | | |
|---|---|---|---|---|
| 6,286,958 | B1* | 9/2001 | Koest | A61B 3/135 |
| | | | | 351/214 |
| 2002/0016586 | A1* | 2/2002 | Shimmick | A61F 9/00804 |
| | | | | 606/5 |
| 2018/0184897 | A1* | 7/2018 | Yamamoto | A61F 9/007 |
| 2019/0298169 | A1* | 10/2019 | Vilser | A61B 3/12 |

FOREIGN PATENT DOCUMENTS

| | | |
|---|---|---|
| EP | 0205688 A1 | 12/1986 |
| EP | 0628298 A1 | 12/1994 |
| EP | 1074214 A1 | 2/2001 |
| EP | 2090222 A1 | 8/2009 |

OTHER PUBLICATIONS

English translation of International Search Report for PCT/EP2020/075031, mailed Jan. 18, 2021, 3 pages.
International Preliminary Report on Patentability for PCT/EP2020/075031, mailed Mar. 24, 2022, 5 pages.

* cited by examiner

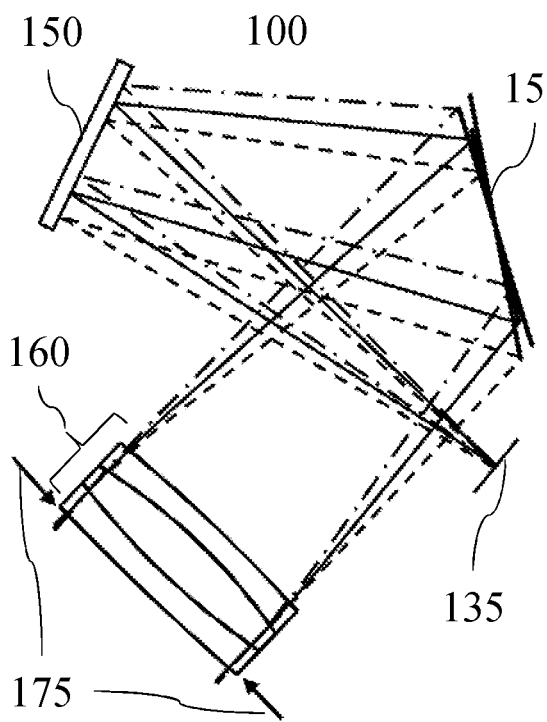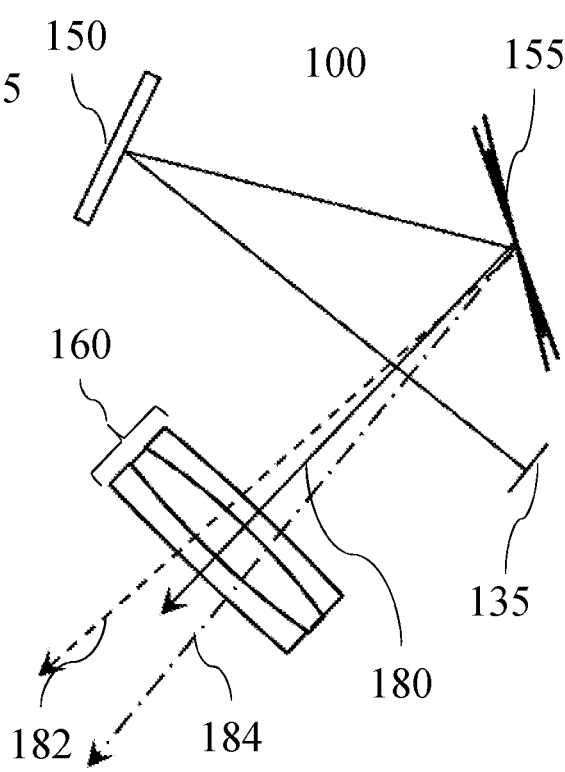
Fig. 3a          Fig. 3b
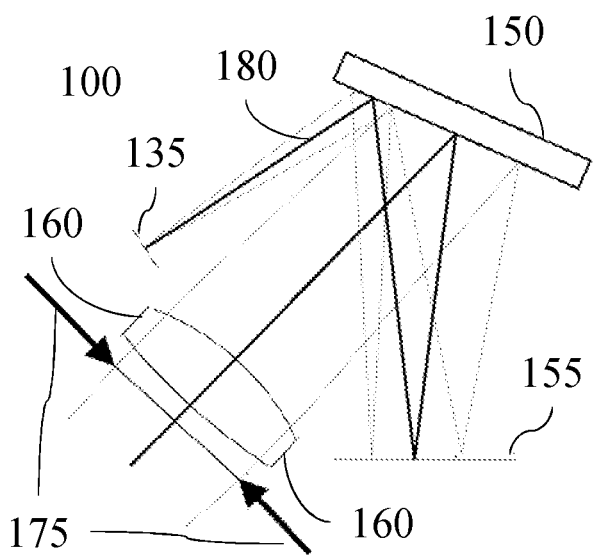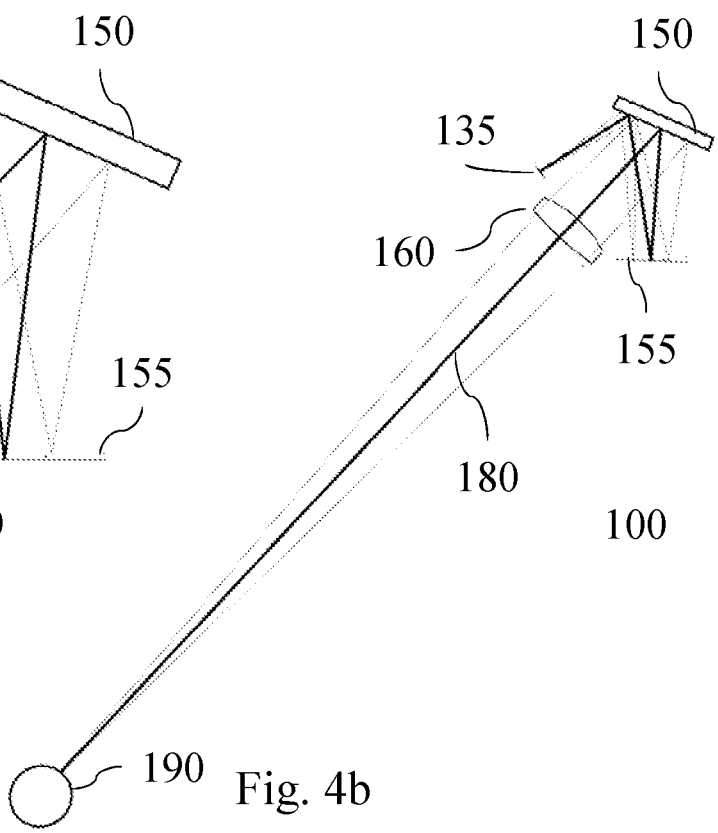
Fig. 4a          Fig. 4b

SLIT PROJECTOR ARRANGEMENT

RELATED APPLICATIONS

This application is a National Phase entry of PCT Application No. PCT/EP2020/075031 filed Sep. 8, 2020, which application claims the benefit of priority to DE application No. 10 2019 213 706.7, filed Sep. 10, 2019 and DE application No. DE 10 2019 219 120.7, filed Dec. 9, 2019, the entire disclosures of which are incorporated herein by reference.

TECHNICAL FIELD

The present invention relates to a slit projector for examining an eye, more particularly for an ophthalmological therapy system, for producing a slit illumination in an eye, the slit projector having a light source, a slit shaping unit and an imaging optical unit along a beam path. The invention also relates to switching unit for a slit projector comprising an operating element. Furthermore, the invention relates to a positioning apparatus for an ophthalmological therapy system comprising a surgical microscope, which has a work location, and comprising a slit projector designed to provide slit illumination, for aligning the slit illumination in an eye. Finally, the invention relates to a slit projector arrangement for an ophthalmological therapy system comprising a surgical microscope, said slit projector arrangement having a slit illumination which comprises a switching unit, and a positioning apparatus.

BACKGROUND

An eye, in particular the anterior eye segment with the cornea or the lens, is frequently examined using what is known as slit illumination, in the context of which a sharply delimited, slit-shaped light beam is directed onto the eye at an angle in relation to the direction from where the eye is examined. A slit is generally imaged onto or into the eye for this purpose. The prior art has disclosed slit projectors which are used especially in slit lamps to illuminate the anterior chamber of an eye and to be able to record sectional images of the anterior eye elements. The most common slit projectors in this context are those consisting of a light source with a slit aperture disposed in front thereof and a lens system arranged in front of the slit aperture. To observe the eye, it is necessary for the slit to be imaged onto the eye to be very bright and as uniformly bright as possible while having a small width, and for the slit projector to offer simple handling and sufficient freedom of action on the eye to the user.

In the meantime, combining a therapy apparatus for carrying out therapy (for example using a laser, ultrasound or mechanical instruments) with an examination apparatus comprising slit illumination—either by way of integration in a common system or by installing the examination apparatus in a spatial vicinity of the therapy apparatus in order to facilitate alternating between the two apparatuses without having to move the patient into another room—has also become commonplace in the field of ophthalmological therapy.

By way of example, this is very advantageous in laser-assisted eye surgery for correcting refractive errors or for the therapy of other eye disorders such as for example a cataract by cataract surgery, where work steps for characterizing the eye structures alternate with surgical steps and steps for verifying the surgical intervention or for assisting the surgical intervention. Thus, the eye structures can be initially characterized by application of optical coherence tomography (OCT) or by application of ultrasound. Subsequently, eye tissue can be cut by application of a pulsed laser beam, for example. The result can then be verified by use of a surgical microscope—generally under slit illumination—and subsequent steps, such as for example aspirating a cloudy eyes lens previously cut by the laser beam and/or comminuted by ultrasound in cataract surgery, can be performed with monitoring by the surgical microscope.

In the case of refractive error corrections, too, for example for performing a "SMILE" treatment, that is to say a lenticule extraction by a small incision ("small incision lenticule extraction"), two main work steps should be performed after preparing the patient and after an appropriate characterization of the eye structures: firstly, the laser therapy, in which the patient's eye is contacted to the laser optical unit by application of a contact glass and laser cuts are implemented in the eye, and, secondly, the lenticule extraction, in which the surgeon removes the lenticule that was cut during the laser therapy with monitoring by a surgical microscope (e.g., under slit illumination).

A similar statement applies for implantations of lenticules in a patient's eye: Here, a corresponding receptacle region in the eye tissue, generally in the corneal tissue of the eye, is initially created by separating this eye tissue and an implant is subsequently introduced into the receptacle region and adapted—for example with monitoring by a surgical microscope with a slit projector.

Known solutions provide for the adaptation of a slit projector on the ophthalmological laser therapy system (with a surgical microscope), it being possible by way of a guide mechanism to bring said slit projector into the various positions required for the examination of a patient's eye. The installation space required to this end has a width of 250 mm or more. This results in the substantial disadvantage that the free space available for patient and operator is restricted by the guide mechanism.

Solutions with improved freedom of action in the treatment field, by contrast, have the disadvantage of a large installation width (for instance 500 mm) on account of using two slit projectors with a large working distance. A large installation width leads to restrictions in the sphere of action, for example for the assistant of the surgeon, and interferes with a "blind" operation of operating elements of the surgical microscope by the surgeon. Furthermore, the solutions according to the prior art do not allow a change in the slit width or such a change is only possible by way of a sequence of different manipulations at different positions (which generally require both hands).

Example embodiments of the present invention overcome the disadvantages of the prior art and provide a solution for a slit projector, a switching unit, a positioning apparatus and a slit projector arrangement for examining an eye and, in particular, for an ophthalmological therapy system, which solution in particular facilitates an improved freedom of action in the treatment field.

A first aspect of the invention relates to a slit projector for an ophthalmological therapy system for producing slit illumination in an eye.

An ophthalmological therapy system is designed to carry out an ophthalmological therapy when used by the user (operating physician, surgeon, operator). Here, an ophthalmological therapy should be understood to mean any therapy in which ocular tissue is modified. In particular, the ophthalmological therapy contains corresponding laser-surgical interventions, in which by application of a laser, for example a pulsed laser such as a femtosecond laser or excimer laser, for example, a tissue of the eye is "cut" by photodisruption, a region of an eye tissue is ablated by an ablation effect or eye tissue is "adhesively bonded" to itself by a coagulation effect, or the refractive index of the material, that is to say of an eye tissue or else an implant, is modified by the laser radiation.

In this context, the ophthalmological therapy system comprises an examination apparatus which has a surgical microscope (sometimes referred to as "OPMI"). A surgical microscope is an optical system that is designed to view a work location in magnified fashion.

The slit projector has a light source, a slit shaping unit and an imaging optical unit along a beam path.

By way of example, the light source can be a thermal light source or semiconductor-based light source. An LED with a small emitter area facilitates a compact structure. Particularly for example, this may be an SMD-LED with an emitter area of less than 1.5 mm$^2$—for example of 1.1 mm×1.1 mm.

The slit shaping unit comprises a slit with a slight height and a slit width. The ratio of slit height to slight width may range between 5 and 150, for example. The slit may be in the form of a slit aperture. Alternatively, the slit may also be the output of an integrator rod or optical fiber. For example, the slit shaping unit has a condenser optical unit to efficiently direct the light from the light source to the slit and in order thus to obtain great light efficiency. To this end, the condenser optical unit may direct the light onto the slit aperture or onto the input of the integrator rod or optical fiber. To achieve a compact structure and high light efficiency, the focal length of the condenser optical unit is for example very short, for example it may range between 3 mm and 10 mm or between 3 mm and 8 mm.

The imaging optical unit is designed to image the slit of the slit shaping unit as a slit image into the patient's eye, in order to generate the slit illumination there. The slit image typically has a slit image height of between 8 mm and 15 mm. The slit image width is frequently up to 2 mm. The slit image width may be less than 500 μm, for example less than 400 μm, in another example less than 200 μm. A small slit image width is preferred, provided the slit image has a sufficiently high intensity. The imaging optical unit may comprise one or more lenses or lens groups.

The imaging optical unit is for example configured such that it produces a slit image at a distance of at least 200 mm in order to provide good freedom of action in the treatment field. In an example embodiment a distance of at least 250 mm is particularly preferred. To facilitate great light efficiency in the process, the imaging optical unit has a large diameter of at least 6 mm, for example at least 8 mm, in another example at least 10 mm.

The slit projector according to the invention furthermore comprises a mirror, the mirror being arranged in the beam path between the slit shaping unit and the imaging optical unit. The mirror can be a front surface mirror or back surface mirror. The mirror can also be embodied such that the beam path between the slit shaping unit and the imaging optical unit extends, at least in sections, within a prism that has a deflection surface (for example a mirror surface).

The described arrangement according to the invention for example allows the beam path to be bent between slit shaping unit and imaging optical unit, and thus allows a more compact design of the slit projector. The freedom of action in the treatment field is improved with the aid of the compact structure of the slit projector facilitated thus.

The imaging optical unit may be designed to axially displace (along an optical axis of the slit projector) the relative position of the slit image to thus facilitate refocusing of the slit image in the eye.

According to an example embodiment the slit projector has a second mirror. The second mirror is arranged in the beam path between the slit shaping unit and the imaging optical unit.

In an example embodiment, light impinges on one of the mirrors in the beam path two times in succession. Along the beam path from the slit shaping unit, light may be initially incident on the first mirror, be reflected from there to the second mirror in order to be incident on the first mirror again and be reflected from there to the imaging optical unit.

A slit project with two (or more) mirrors facilitates multiple folding of the beam path and therefore allows a further reduction in size of the structure. In this case, light can impinge on the mirror at different locations and/or at different angles.

The use of two mirrors—especially if light impinges multiple times on one mirror—allows a particularly compact structure of the slit projector.

In a particular example embodiment of the slit projector, a reflection angle of the beam path at the mirror is an angle of less than 90° (also referred to as "acute angle"), for example of less than or equal to 60°, in another example of less than or equal to 45°.

Here, the reflection angles should be understood to mean the angle of the axial ray or centroid ray of the light beam for light incident on the mirror in relation to the axial ray (or centroid ray) of the reflected light.

Such an arrangement facilitates a particularly compact structure of the slit projector since it has a "light-filled" volume. This applies in particular if the beam path crosses itself and/or if at least two, or even all, reflection angles have the aforementioned maximum values.

According to a further particularly preferred example embodiment of the slit projector, a mirror has a movable embodiment and is therefore designed to tilt the beam path.

A mirror embodied thus is also referred to as a tilting mirror. The reflection angle is different depending on the tilt position of the tilting mirror. For example, the axis of rotation (tilt axis) of the tilting mirror is aligned parallel to the orientation of the slit height. The axis of rotation can be situated on a mirror surface or away from the mirror surface. The beam direction in which the beam path leaves the imaging optical unit in the direction of the eye can be altered in this way so that the slit image is incident on the eye at different locations (and at slightly different angles). In this way, the slit image can for example be moved over the eye and thus allows the operator to observe the whole eye.

In an embodiment of the slit projector, the imaging optical unit has a magnification of between 1 and 5, for example of between 1 or 1.5 and 3, in another example of more than 1.5 and less than 2.

A ratio of the distance between slit and imaging optical unit along the beam path to distance between imaging optical unit and slit image (of for example 200 mm or in another example 250 mm) emerges to a good approximation in correspondence with the magnification of the imaging optical unit. Therefore, a high magnification would be expected in order to facilitate a compact structure. Then again, a high magnification requires a small slit. This in turn requires great precision when manufacturing the slit and leads to high production costs. As a result of the restriction of the magnification according to the invention it is possible, firstly, to use a (comparatively) large slit, which can be manufactured economically, and, secondly, to realize a compact structure by using one mirror (or—commonly—more mirrors).

According to a further example embodiment of the slit projector, the slit shaping unit is designed to modify a slit width. For example, the slit width can be modified such that a slit image width of less than 200 µm can be generated on the eye.

By way of example, a continuous modification of the slit width may be realized by way of a mechanical slit stop which has partial stops that can be displaced relative to one another. Alternatively, the slit shaping unit may provide discrete slit widths. By way of example, this may be realized by way of slits with different slit widths, which are arranged in an interchanger or a drum, roller or turret, and which may be pushed or rotated in front of the light source.

A change in the slit width facilitates a change in the slit image width and consequently an improved examination of transparent eye structures by the operator.

In an example embodiment, the slit projector has an aperture shaping unit which is designed to variably trim the beam path in an aperture.

The aperture shaping unit may be in the form of a variable iris diaphragm. Alternatively, it may be realized, for example, by way of stops of different sizes, which are arranged in an interchanger or a drum, roller or turret, and which may be pushed or rotated into the beam path. This may also be a plug-on stop. The stops may also be referred to as aperture stops.

For example, the aperture shaping unit is arranged in the beam path near the imaging optical unit. In the case of a multi-part imaging optical unit, said aperture shaping unit may also be located within the imaging optical unit.

The luminous flux reaching the eye can be influenced with the aid of the aperture shaping unit. In this way, it is possible to shape the aperture and, additionally, adjust the brightness of the slit image.

The aperture shaping unit may also be embodied as a variable, mechanical rectangular stop, having a fixed length (height) and a variable rectangular width. In this case, the rectangular width is for example oriented parallel to the alignment of the slit image width. The depth of field of the slit image can be modified by modifying the rectangular width. An increase in the depth of field leads to smaller imaging aberrations and to a widening of the slit image width. An aperture shaping unit configured thus allows precise influencing of the slit image width.

According to a further embodiment, the slit projector has an attenuation unit which is designed to variably attenuate the light provided by the light source.

The attenuation unit may comprise reflecting or absorbing filters which have different levels of reflectance or absorption and which can be variably placed in the beam path. They may be arranged on an interchanger or on a drum, roller or turret. Attenuation in discrete steps can be realized in this way. It may also be a wedge filter that can be pushed into the beam path; this facilitates continuous attenuation. The filters are arranged in the beam path, for example between slit and imaging optical unit.

The attenuation unit may also be an electrical design: to this end, current or voltage of the light source may be controlled.

The luminous flux in the slit image depends on the chosen slit dimension and, optionally, on settings of the aperture shaping unit. An increase in the slit or in the stop of the aperture shaping unit increases the luminous flux. Advantageously, the luminous flux of the eye is so low that there is no damage to the eye, but high enough for an observation by the user. In a particular example development, the slit projector therefore has an attenuation unit and also a slit shaping unit which allows changing the slit width and/or an aperture shaping unit. In this context, these are designed, in the case of a modification of the slit width and/or a change in the trim of the aperture, to attenuate the light provided by the light source so that a luminous flux at to the eye remains constant to within ±30%, for example to within ±15%, in another example to within ±10%.

To this end, the slit shaping unit or the aperture shaping unit may be mechanically coupled to the attenuation unit. By way of example, the filters of the attenuation unit may be arranged (e.g., on the opposite side) on a common interchanger, a drum, roller or turret together with various slit stops or aperture stops of the slit shaping unit and/or together with the aperture shaping unit. When the slit width is changed there can be a simultaneous attenuation of the provided light in this way. By way of example, if there is a change to a slit stop with twice the slit width, a filter having half the transmission is simultaneously brought into the beam path.

The coupling between slit shaping unit and/or the aperture shaping unit and attenuation unit may also have an electrical embodiment: current or voltage of the light source can be controlled on the basis of slit size (or the settings of the aperture shaping unit).

Coupling between the slit shaping unit and/or aperture shaping unit and the attenuation unit is particularly advantageous for example as the operator need not make any further adjustments to be able to carry out examinations on the eye when the slit width is changed (or the trim of the aperture is modified).

Typically, the slit projector has a support structure, to which the light source, slit shaping unit, mirror and imaging optical unit are fastened. In this example embodiment, a heatsink for the light source is advantageously integrated in the support structure such that dissipation of heat can be implemented efficiently and a compact structure is realized at the same time.

The slit projector for example has a mechanical interface which allows the latter to be connected to the surgical microscope or a positioning apparatus. By way of the positioning apparatus it is possible to arrange the slit projector relative to the surgical microscope such that the optical axes of surgical microscope and slit projector cross at an angle of between 35° and 50°, for example 45°±5°. In this case, the respective focal spots—within the respective depths of field—are, for example located at the crossing point in the eye.

For example, the mechanical interface is embodied such that optional retrofitting of a slit projector is possible.

The slit projector, for example has an electrical interface which permits a transmission of electric or electronic signals or signal data to or from the slit projector. By way of example, in this context this may be a power supply for the light source or for motorized units such as the slit shaping unit (for changing the slit), the tilting mirror, the aperture shaping unit or the attenuation unit. This may also relate to signal data about the state of the units, or to signal data containing a command for changing a state, for example activate or deactivate the light source or carry out a slit change.

The slit projector, for example has a slit projector control unit. The latter may be designed to monitor states of units of the slit projector (optionally outputting error messages via the interface) or to couple the function or control of a plurality of units of the slit projector, for example to regulate the luminous flux by controlling the attenuation unit when the slit width is changed. The slit projector control unit may be a computer comprising a processor and a memory.

A second aspect of the invention addresses the problem of a simple operation of a slit projector, and relates to a switching unit for a slit projector. The slit projector is, for example in the form of one of the above-described embodiments. The switching unit has an operating element. By way of example, the operating element may be a knob or a slider. The operating element may be brought into various switching positions.

According to the invention, the switching unit has a first switching region and a second switching region. Expressed differently, at least one switching position of the operating element may be assigned to a first switching region and at least one switching position may be assigned to a second switching region. In this case, the first switching region is designed to carry out a first switching function and the second switching region is designed to carry out a second switching function. In this case, a switching function should be understood to mean the triggering of a (continuous, discrete) switchover procedure. In this context, when a slit projector is used, this may for example relate to changing the current or voltage of the light source, adjusting the slit width or tilting the slit illumination at an eye by operation of a tilting mirror. In this case, a function value of the switching function specifies the type or position of the switchover procedure.

Furthermore, the switching unit is distinguished in that the first switching function differs from the second switching function.

An advantage of the switching unit according to the invention is that only one operating element is needed for the control of a plurality of switching functions. This allows simple ("blind") handling.

The operating element can be embodied such that it allows an operation on two sides of the slit projector; in this case, the switching regions and switching functions are identical. This is advantageous, for example, if the slit projector is altered in terms of its position in relation to the operator, for example to be able to generate slit illumination once from the right and once from the left.

The operating element may be spatially detached from the slit projector. A transmission of function values from the operating element to the slit projector can be implemented electrically via cables, in wireless fashion or in mechanical fashion.

It should be noted that the slit projector may have further input elements (e.g., an on/off switch) in addition to the operating element, but these further input elements need not be used during the intervention or when the surgical microscope is used to observe the eye.

The function values assigned to a switching function may be mechanical function values, for example a rotation or translation. These may be translated by use of a gearing, for example if the rotary range of a rotary knob is greater than or less than the desired rotary range/tilting range of a tilting mirror. The function values may also be electrical function values, for example a current, a voltage or signal data.

More than one switching function may be assigned to a switching region. Thus, for example, both the slit width and the attenuation of the luminous flux may be changed by the same switching region in the slit projector. The switching functions are then coupled to one another. The switching element may then be embodied such that no second switching function is carried out in the first switching region and/or such that no first switching function is carried out in the second switching region.

The switching regions may be linked to different operating movements of the operating element. Thus, for example, pressing a rotary knob or slider may trigger a first switching function while rotating or sliding is assigned to the second switching function.

According to an example embodiment, the switching unit is embodied such that the first switching region can be assigned a first operating movement of the operating element and the second switching region can be assigned a second operating movement of the operating element. In this case, the first operating movement and the second operating movement are identical.

By way of example, an operating movement may refer to rotating, sliding or pressing the operating element. The corresponding switching region may then accordingly be a rotary range (angle range), a sliding range or a pressing range (depth of the pushbutton).

The switching regions may adjoin one another on one or two sides. In an example for adjoining on two sides, an angle range from −45° to +45° (in relation to a central position) may be assigned to a first switching range for a rotary knob; the angle ranges from −130° to −45° and the angle ranges from +45° to +130° may be assigned to the second switching region.

In an example embodiment of the switching unit, the first switching function has a multiplicity of discrete or else continuous first function values and/or the second switching function has discrete second function values.

By way of example, the first switching region may be assigned the first switching function of modifying the tilt angle of the tilting mirror of the slit projector, of changing the slit width by way of a slit stop, of changing the aperture by way of an iris diaphragm or of changing the attenuation of the light by way of the current via continuous or a multiplicity of discrete (quasi-continuous) function values. In this case, the first switching region can be assigned to the rotary region of a rotary knob of between ±20° and ±90° (in relation to a central rotary position of the rotary knob); for example between ±30° and ±70°, in another example between ±40° and ±60°

By way of example, the second switching region can be assigned the second switching function of changing the position of an interchanger (drum, roller, turret) in order thus to change the slit width, the shape of the aperture stop or the attenuation of the light in discrete steps. The second switching region can also be assigned the switching function of activating or deactivating the light source of the slit projector.

The two switching regions, for example have the same operating movement. In another example, the second switching region adjoins the first. In yet another example, the second switching region adjoins the first on both sides; in this case, the switching functions of the second switching region may have different signs: By way of example, if the first switching region (e.g., for modifying the tilt angle of the tilting mirror) is exceeded in one direction and the second switching region is reached, the second switching function is triggered with a first sign (e.g., switching direction of an interchanger in the slit shaping unit which increases the slit width). If the first switching region is exceeded in the other direction and the second switching region is reached, the second switching function is triggered with a second (opposite) sign (e.g., opposite switching direction of the interchanger such that a slit with a smaller slit width is pivoted in).

A combination of embodiments of the slit projector according to the invention with embodiments of the switching unit according to the invention is particularly advantageous for example since the compact structure of the slit projector also facilitates a compact embodiment of the switching unit (particularly in the case of mechanical switching functions).

A third aspect of the invention relates to a positioning apparatus for an ophthalmological therapy system comprising a surgical microscope, which has a work location. The work location of the surgical microscope typically corresponds to the focal region. It is located on the optical axis of the surgical microscope and has a (lateral) extent perpendicular to the latter which corresponds to the image field of the surgical microscope. The axial extent is typically linked to the depth of field of the surgical microscope. The invention furthermore relates to a positioning apparatus for an ophthalmological therapy system comprising a slit projector which is designed to provide a slit illumination. The slit projector is, for example embodied according to of the embodiments described further above. The positioning apparatus serves to align the slit illumination in an eye.

In this context, the positioning apparatus has a holding element which is configured to be connected to the surgical microscope. Furthermore, the positioning apparatus has a fastening element which is configured to be connected to the slit projector. Moreover, the positioning apparatus comprises a pivoting element which has a first connection, by operation of which the pivoting element is movably connected to the holding element. Moreover, the pivoting element has a second connection, by operation of which the pivoting element is movably connected to the fastening element. By way of example, the connections may be embodied as a folding connection (for folding), as a rotary connection (for pivoting, rotating) or as a sliding connection (for example like a system consisting of drawer and guide).

The positioning apparatus is furthermore configured to move the fastening element between two positions that differ from one another in relation to the holding element. If the positioning apparatus is connected to the surgical microscope (at the holding element) and to the slit projector (at the fastening element), the surgical microscope and the slit projector can be moved in relation to one another and can be brought into two positions relative to one another. According to the invention, the positions are distinguished in that the slit illumination is aligned on the work location for both positions. This means that the slit image is located within the work location (and its extent).

An advantage of the positioning apparatus according to the invention is that this facilitates the examination of the eye using a surgical microscope, with the slit illumination being generated from two different positions (also referred to as end positions or work positions). This facilitates an improved observation of eye elements in the eye and can consequently improve the result of the therapy.

In a plane perpendicular to the optical axis of the surgical microscope, the two work positions are, for example at an angle (relative to the optical axis of the surgical microscope) of 180°±10° with respect to one another, for example 180°±5°, in another example 180°±2°. In an example embodiment, the two work positions are—as seen from the user—to the right and left of the surgical microscope. The angle at which the optical axis of the surgical microscope and the beam path of the slit projector cross at the work location is, for example between 35° and 50°, in another example 45°±5°.

It should be noted that the slit illumination need not be aligned on the work location for further positions that deviate from the aforementioned two different positions.

The holding element is, for example embodied such that it can be securely connected to the surgical microscope. In this case, the holding element can be embodied such that the positioning apparatus can optionally be retrofitted. The fastening element may be embodied such that it can be securely connected to the slit projector. The fastening element may also be configured such that it can be movably connected to the slit projector, for example in order to rotate or tilt the slit projector in relation to the fastening element.

For example, the work location of the surgical microscope corresponds to the therapy location of the ophthalmological therapy system, that is to say the location at which the therapy may be performed is located within the work location of the surgical microscope.

According to an example embodiment, the positioning apparatus is embodied such that the fastening element can be moved into a third position, which differs from the first and the second position, in relation to the holding element. In this third position, an extent of the positioning apparatus is smaller than in the first and second position.

The extent of the positioning apparatus should be understood to mean the dimensions (area) of its the base area (projection of the positioning apparatus along the optical axis of the surgical microscope). The third position brings the slit projector into a parked position. The slit illumination need not be aligned on the work location in this parked position.

In a plane perpendicular to the optical axis of the surgical microscope, the parked position is, for example at an angle (relative to the optical axis of the surgical microscope) of 90°±10° with respect to the two work positions, for example 90°±5°, in a further example 90°±2°.

The surgical microscope has a beam path between a surgical microscope optical unit and the eye. In an example embodiment of the positioning apparatus, the holding element and/or the pivoting element and/or the fastening element have a cutout. The cutout is designed not to affect the beam path of the surgical microscope when the positioning apparatus is in the first, second and third position.

The beam path of the surgical microscope may be affected if the positioning apparatus is in a position other than one of the work positions or the parked position.

According to an embodiment of the positioning apparatus, the first connection is in the form of a rotary connection and/or the second connection is in the form of a rotary connection or sliding connection.

In a first variant of the above-described embodiment of the positioning apparatus, both connections are embodied as rotary connections. In this case, the axes of rotation of the first and second connection are in parallel. In a development of the embodiment, the first and second connection are coupled by way of a coupling element. This means that when the first connection rotates the second connection rotates at the same time. By way of example, the coupling element may be a toothed belt.

The two connections and the coupling element may be embodied such that the coupling has a transmission. Expressed differently, should the first connection be rotated through a first rotary angle, then the resultant rotation of the second connection through a second rotary angle may deviate from the first rotary angle.

In a second variant of the above-described embodiment of the positioning apparatus, the fastening element and/or the pivoting element is embodied as an arcuate segment.

The arcuate segments are, for example embodied as segments of a circle and the fastening element and/or the pivoting element are arranged such that the circle center coincides with the work location for the two work positions.

For example, both fastening element and pivoting element are embodied as an arcuate segment, and the first connection is embodied as a rotary connection and the second connection is embodied as a sliding connection. In this way, it is possible to modify the angle of the optical axis of the surgical microscope in relation to the beam path of the slit projector by displacing the fastening element in relation to the pivoting element (by way of the sliding connection), with the slit illumination remaining aligned on the work location.

According to one embodiment of the positioning apparatus, the first connection has a stop which restricts a movement between pivoting element and holding element. Additionally or as an alternative, the second connection has a stop which restricts a movement between pivoting element and fastening element.

By way of example, if a connection is a rotary connection, the rotary angle range can be restricted by the stop. Should the connection be a sliding connection, the sliding range can be restricted by the stop. Should the connection be a folding connection, the folding range can be restricted by the stop. In the process, the restrictions are, for example embodied such that a movement between the work positions (and optionally the parked position) is possible, but no movement beyond these.

Alternatively or in addition, the first and/or second connection may be embodied such that the holding element latches vis-à-vis the pivoting element and/or the fastening element latches vis-à-vis the pivoting element when a work position and/or the parked position is reached. Moving the positioning apparatus out of one of these "latched" positions is only possible with increased effort (in relation to normal movements).

Alternatively or in addition, the first and/or second connection may have a brake and/or lock, which is designed to block the movement between holding element and pivoting element and/or between fastening element and pivoting element. The brake may be configured such that it can be released or applied by the operator.

With the aid of the described embodiments, the work positions and optionally the parked position are stabilized and rendered insensitive to an unwanted movement from said positions.

According to an embodiment, the positioning apparatus has an electrical interface to the surgical microscope and an electrical interface to the slit projector. Furthermore, an electrical line is integrated in the positioning apparatus for the purposes of transporting electric or electronic signals between the two electrical interfaces.

An integration of the line is advantageous for example in order to ensure transport for any desired positions of the positioning apparatus.

By way of example, a power supply between the surgical microscope and the slit projector can be realized by way of the electrical line and the interfaces. Additionally, information about a state (e.g., slit width) or commands (e.g., illumination on/off) can be exchanged between surgical microscope and slit projector.

In an embodiment, the positioning apparatus has a sensor which is designed to detect a relative position between fastening element and pivoting element. Additionally or as an alternative, it has a sensor which is designed to detect a relative position between holding element and pivoting element.

By application of such a sensor, it is possible to determine whether the positioning apparatus is in a work position, in a parked position or in a position deviating therefrom. By way of example, such a sensor may be a slotted optocoupler. By way of example, the sensor signals may be transmitted to the surgical microscope and/or the slit projector by way of a suitable interface or they may be processed further internally; to this end, the positioning apparatus may have a positioning control unit. The positioning control unit may be a computer comprising a processor and a memory. Furthermore, the sensor signals may for example also directly control the light source of the slit projector or a light source of the surgical microscope—for example by switching the corresponding current feed.

A further aspect relates to a slit projector arrangement for an ophthalmological therapy system comprising a surgical microscope. According to the invention, the slit projector arrangement has a slit projector according to any one of the above-described embodiments, for example comprising a switching unit according to any one of the above-described embodiments. Additionally or as an alternative, the slit projector arrangement has a positioning apparatus according to any one of the above-described embodiments.

A combination of the positioning apparatus according to the invention with the slit projector according to the invention for example is particularly advantageous since the shear forces on the positioning apparatus (and hence on the surgical microscope or the ophthalmological therapy system) remain low as a result of the slit projector according to the invention owing to the compact structure of the slit projector. A combination with the switching unit according to the invention is likewise for example particularly advantageous since it likewise reduces the shear forces on account of its compact structure.

According to an advantageous example embodiment the slit projector arrangement has a control unit. The latter is designed to process state information regarding the slit projector and/or the positioning apparatus and, in particular, the surgical microscope. Furthermore, the control unit is designed to provide control signals for the slit projector and/or for the surgical microscope. The control unit may be a computer comprising a processor and a memory.

The control unit may be part of a slit projector control unit, a positioning control unit, a surgical microscope control unit or the control unit of the opthalmological therapy system.

In a further example embodiment of the slit projector arrangement with a control unit as described above, the positioning apparatus has a sensor. In this case, the sensor is designed to provide first sensor signals when the positioning apparatus is in a first or second position, and provide second sensor signals when the positioning apparatus is in a third position. Thus, first control signals are assigned to a work position and second sensor signal are assigned to the parked position. The control unit is designed to receive the sensor signals. Furthermore, the control unit provides control signals for activating the light source of the slit projector and for deactivating a light source of the surgical microscope when first sensor signals are received, and the control unit provides control signals for deactivating the light source of the slit projector and for activating the light source of the surgical microscope when second sensor signals are received.

According to the invention, the described slit projector arrangement allows the impingement of light from the slit projector on the eye only if the positioning apparatus is in a work position, in which the slit illumination produced thereby is directed at the work location of the surgical microscope. Additionally, light from the light source of the surgical microscope impinges on the eye only if the positioning apparatus is located in its parked position. The respective other light source is deactivated.

By way of example, the sensor may be a slotted optocoupler. Should the sensor have control electronics, the latter can be part of the control unit.

It is understood that the features mentioned above and the features still to be explained below can be used not only in the specified combinations but also in other combinations or on their own without departing from the scope of the present invention.

BRIEF DESCRIPTION OF THE DRAWINGS

The invention is explained in greater detail below for example with reference to the accompanying drawings, which also disclose features essential to the invention. In the figures:

FIGS. 3a, 3b and 3c show schematic illustrations of a section of the beam paths or complete beam path of a slit projector for a second example embodiment;

FIGS. 4a, 4b and 4c show schematic illustrations of a section of the beam path or the complete beam path of a slit projector for a third example embodiment;

DETAILED DESCRIPTION

Figure 1:
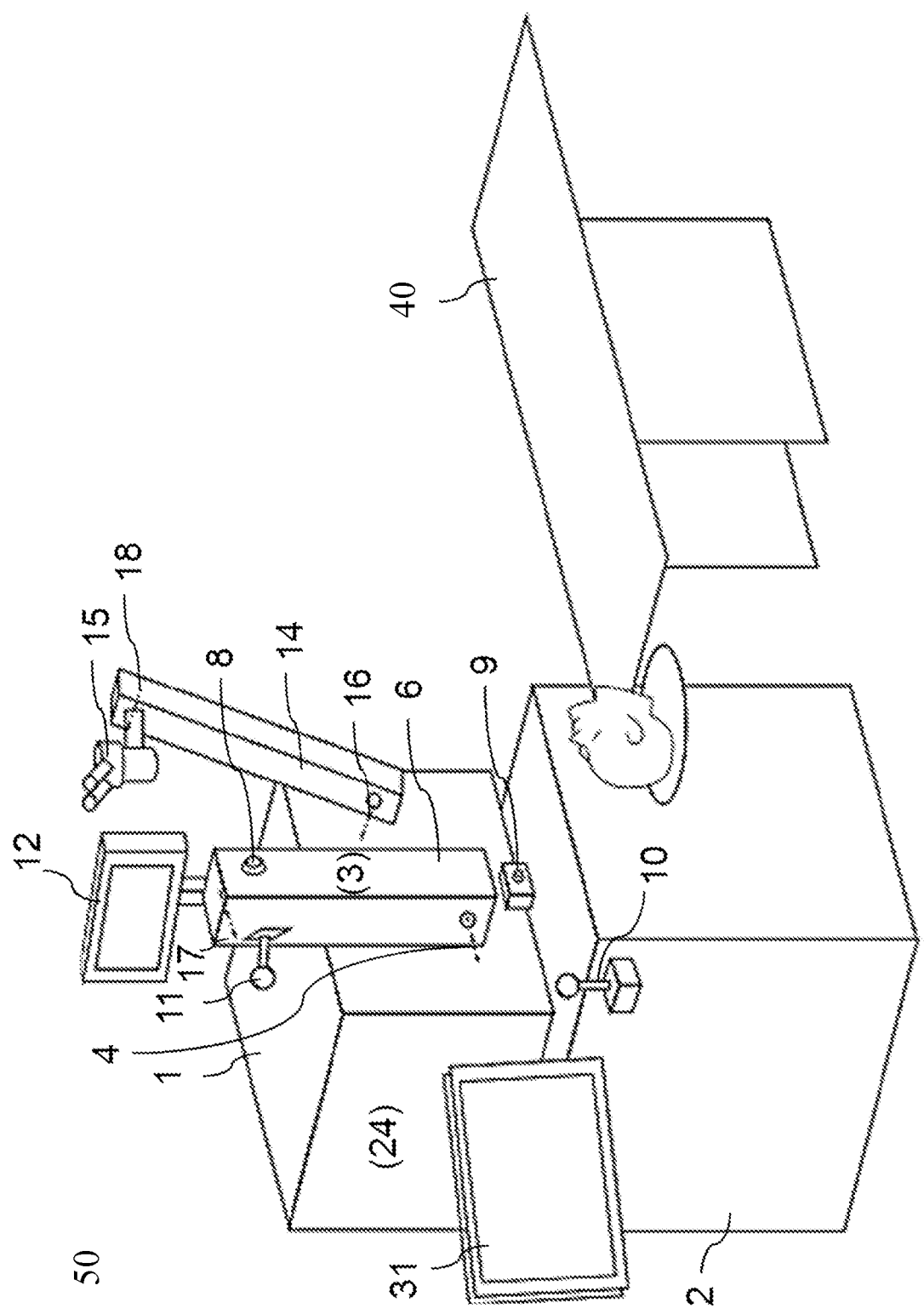
FIG. 1 depicts an example ophthalmological therapy system comprising a surgical microscope.

FIG. 1 shows a schematic illustration of an ophthalmological therapy system 50. It should be noted in this respect that the patient bed 40 is not part of the ophthalmological therapy system 50 but is merely illustrated in the figure for a better understanding.

The ophthalmological therapy system 50 is embodied as a laser therapy system here and is distinguished by a laser pivot arm 3 that is fastened to the apparatus head 1 in a manner pivotable about a horizontal axis 4 and that can be pivoted back and forth between a rest position and a work position. For laser therapy on the patient's eye, this laser pivot arm 3 can be pivoted over the patient. However, in steps in which the laser pivot arm 3 is not required, it can be brought back into a rest position so that the space above the work position can be used for different things. A laser exit opening 8 from where the therapy laser beam is guided to the therapy location in the patient's eye (when the laser pivot arm 3 is in the work position), is located on the laser pivot arm 3.

Furthermore, the laser therapy system 50 comprises an independent examination pivot arm 14, which may be moved about a pivot axis 16. The examination pivot arm 14 can likewise be pivoted back and forth between a rest position and a work position. A surgical microscope 15 is connected to the examination pivot arm 14 about a rotatable axis 18. The pivot axis 16 and the rotatable axis 18 are configured such that the work location of the surgical microscope 15 in the work position coincides with the therapy location.

The further reference signs in FIG. 1 are as follows: 2—device base, 6—pivot arm housing, 9—camera, 10—joystick for controlling the device head 1, 11—joystick for controlling the laser pivot arm 3, 12—visual display unit, 17—axis of rotation of the visual display unit 12, 24—laser structures in the device head 1, 31—planning visual display unit.

Figure 2:
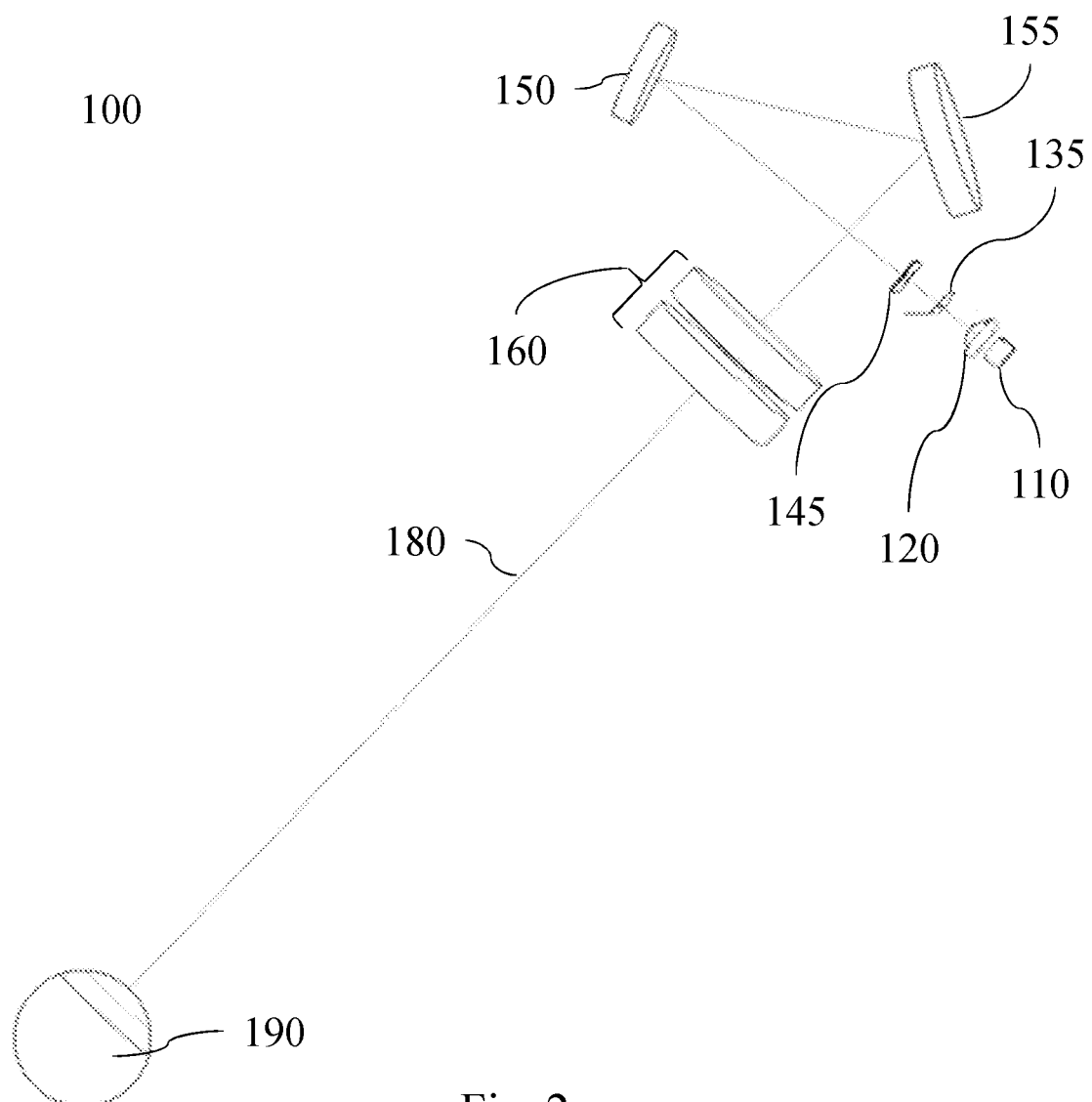
FIG. 2 is a schematic illustration of the beam path of a slit projector for a first example embodiment.

FIG. 2 shows a schematic illustration of the beam path 180 for a first example embodiment of a slit projector 100 according to the invention. A light source 110 which is embodied as an LED emits light which is directed by a condenser 120 to the slit stop 135 of a slit shaping unit. According to the invention, the beam path 180 is folded at the mirrors 150 and 155 in order to obtain a compact structure. By way of the imaging optical unit 160 (formed here with two lenses), the slit stop 135 is imaged into the eye 190 as a slit image. A filter 145 (as part of an attenuation unit) is arranged in the beam path 180 between the slit stop 135 and the first mirror 150. In this figure (and the following figures), the slit stop 135 is oriented such that the slit width is in the plane of the drawing and the slit height is perpendicular to the plane of the drawing.

The reflection angles at the mirrors 150 and 155 are smaller than 45° and approximately 60°, respectively. The space between the mirrors 150, 155 and the imaging optical unit 160 is "filled with light" and consequently facilitates a compact structure.

To attain the high light efficiency with a narrow slit width at the same time, an SMD LED that is as small as possible (<1.1 mm×1.1 mm) and a condenser 120 with a very short focal length of less than 5 mm are used to illuminate the slit stops 135. The slit stop 135 is imaged toward the eye 190 using the imaging optical unit 160. In this example, the imaging scale is −1×. The diameter of the imaging optical unit 160 is chosen to be as large as possible; it is 20 mm. This is for example advantageous in that the slit stop 135 need not be designed to be too small, even for a small slit image width of 250 µm as shown here, and hence it is manufacturable more accurately and more cost-effectively.

The mirrors 150, 155 are planar in the shown first example embodiment. The entire volume may be filled with one material (glass/plastic), or further elements (mirrors) may be arranged in the beam path 180 in the case of other reflection angles.

FIGS. 3a and 3b show a schematic illustration of a section of the beam paths 180, 182, 184 for a second example embodiment of a slit projector 100. The sections show the beam paths 180, 182, 184 from the slit stop 135 to the imaging optical unit 160.

The example embodiment shows a second mirror 155 which can be tilted (a pivoting or tilting mirror); this is indicated by the three illustrated positions of the mirror 155.

Figure 3C:
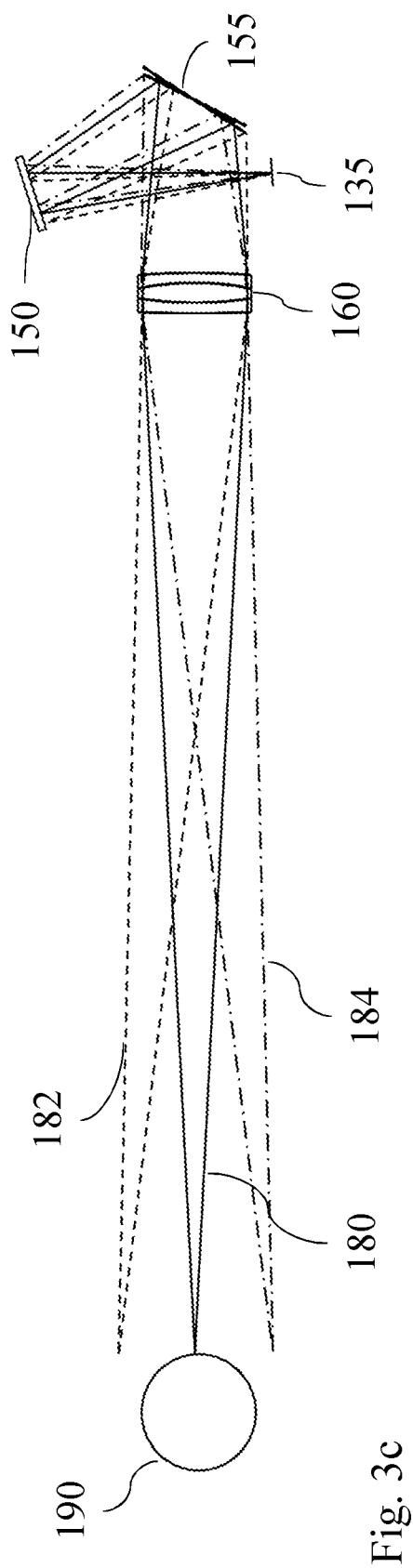

FIG. 3b shows the beam path of the axial rays for a central position of the tilting mirror 150 (solid line 180), for a first edge position (dashed line 182) and for a second edge position (dash-dotted line 184). Tilting the mirror 155 results in a change in the illumination angle in relation to the eye 190 (and hence also to a shift in the slit image in relation to the eye; cf. FIG. 3c). FIG. 3a shows the course of the marginal rays of the beam paths 180, 182, 184 to imaging optical unit 160, likewise for three positions of the tilting mirror 155.

An aperture stop 175 (an aperture shaping unit) is additionally illustrated by two arrows in FIG. 3a. This allows the operator to set both the brightness and the width of the slit image on the eye 190 more sensitively than what is rendered possible by a slit change by application of a slit shaping unit with interchangeable (discrete) slit widths. Furthermore, reducing the width of the aperture stop 175 allows the depth of field of the slit image in the eye to be increased such that this slit image remains sharply delimited and narrow even in the case of movements of the tilting mirror 155 and of the slit image over the curved eye.

FIG. 3c shows the marginal rays of the beam paths 180, 182, 184 (like in FIG. 3a) from the slit stop 135 to the eye 190. This illustration shows how tilting the mirror 155 leads to a change in the illumination angle or illumination position on the eye 190.

FIGS. 4a and 4b show schematic illustrations of a section or the complete beam path 180 of a slit projector 100 for a third example embodiment. In this example embodiment, light impinges on the first mirror 150 two times. While the beam path 180 in FIG. 4b is shown from the slit stop 135 via the first mirror 150 to the second mirror 155, back to the first mirror 150, to the imaging optical unit 160 and finally to the eye 190, FIG. 4a shows the section of the same beam path 180 from the slit stop 135 to the imaging optical unit 160. Both the axial rays (lines of normal thickness) and the marginal rays (thin lines) are shown for the beam paths 180 in FIG. 4a and FIG. 4b. The shown third example embodiment has a particularly compact structure. In this case, the reflection angles at mirror 150 are less than 90° for the first reflection and less than 45° for the second reflection, and less than 45° and for the reflection at mirror 155.

FIG. 4a additionally shows an aperture stop 175 of an aperture shaping unit.

Figure 4C:
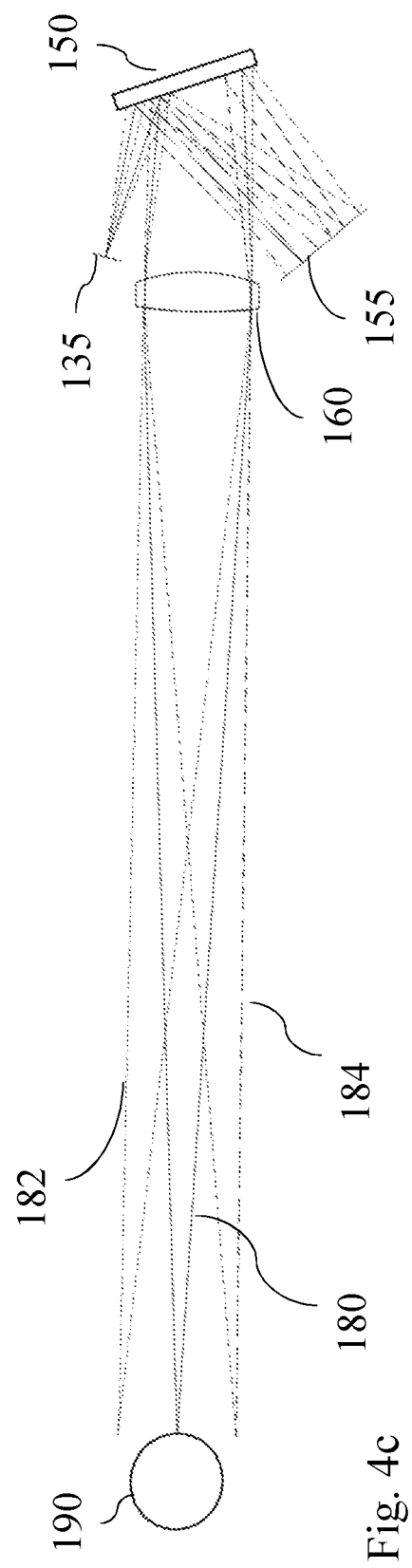

In this third example embodiment the second mirror 155 may also be embodied as a tilting mirror and consequently facilitate tilting of the slit illumination on the eye 190. In FIG. 4c, this is shown for the marginal rays of three beam paths 180, 182, 184 from the slit stop 135 to the eye 190. This illustration shows how tilting the mirror 155 leads to a change in the illumination angle (or an illumination position) on the eye 190. Alternatively, the mirror 150 can also be embodied as a tilting mirror.

Figure 5A:
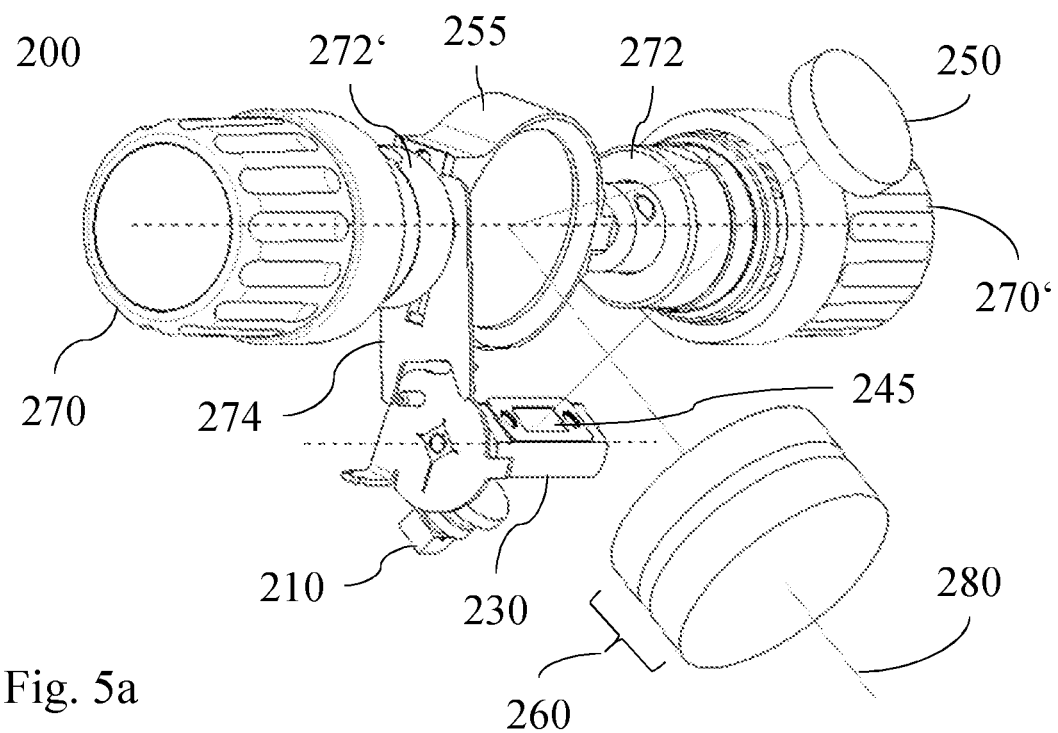
FIGS. 5a and 5b show perspective illustrations (from different directions) of an example embodiment of a switching unit for a slit projector.
Figure 5B:
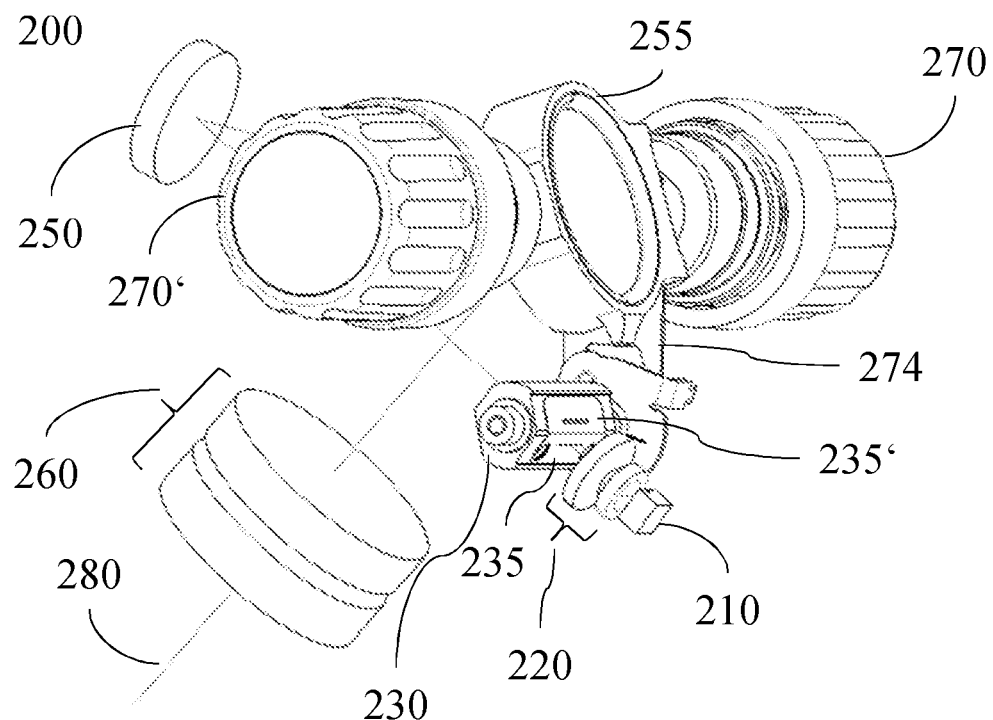

FIGS. 5a and 5b show perspective illustrations (from two directions) of an example embodiment of a switching unit 200 for a slit projector. The switching unit 200 has two rotary knobs 270, 270' as a common operating element. The two rotary knobs 270, 270' make use of identical switching regions and switching functions. The rotary knobs 270, 270' allow both adjustment of the position (tilt) of the illumination slit on the eye (first switching function) and switching over of the slit width (and hence the slit image width; second switching function).

To move the slit image on the eye, the rotary knob 270, 270' is swiveled (rotated) for approximately ±45°; this is the first switching region. A gearing 272, 272' which improves the sensitivity of the slit pivoting is arranged between the rotary knob 270, 270' and the optical pivotable mirror (the tilting mirror 255 in this case). The tilting mirror 255 can be pivoted through approximately ±7° by way of the rotary knob 270, 270'.

If the rotary knob 270, 270' is rotated further to an angle between approximately 45° and 130° (second switching region), a rotary roller (turret) 230 is actuated by a lever 274 and switched over. (At least) two slit stops 235, 235' with different slit widths are located on the rotary roller 230. If the rotary knob 270, 270' is rotated back (into the first switching region), the tilting mirror 255 is also rotated back. Thus, the slit image can be repositioned on the eye. There is no change in the set slit width in the process. To set another slit width, the rotary knob 270, 270' is rotated in the other direction, also to angles between approximately 45° and 130° (into the second switching region). Thus, the second switching region adjoins the first switching region from two sides.

An additional filter 245 (of an attenuation unit) is pivoted into the optical beam path 280 using the same slit switchover mechanism, the additional filter likewise being arranged on the rotary roller 230, opposite the slit 235 or 235', such that the brightness (entire luminous flux at the eye) automatically remains the same in the case of a slit change without requiring additional actions of the user.

Alternatively, the current of the light source 210 may also be automatically reduced (or increased) in the case of a slit change.

The shown optical arrangement is the second example embodiment of a slit projector (cf. FIGS. 3a, 3b and 3c).

The further reference signs in FIGS. 5a and 5b are: 220—condenser, 250—first mirror, 260—imaging optical unit.

Figure 6:
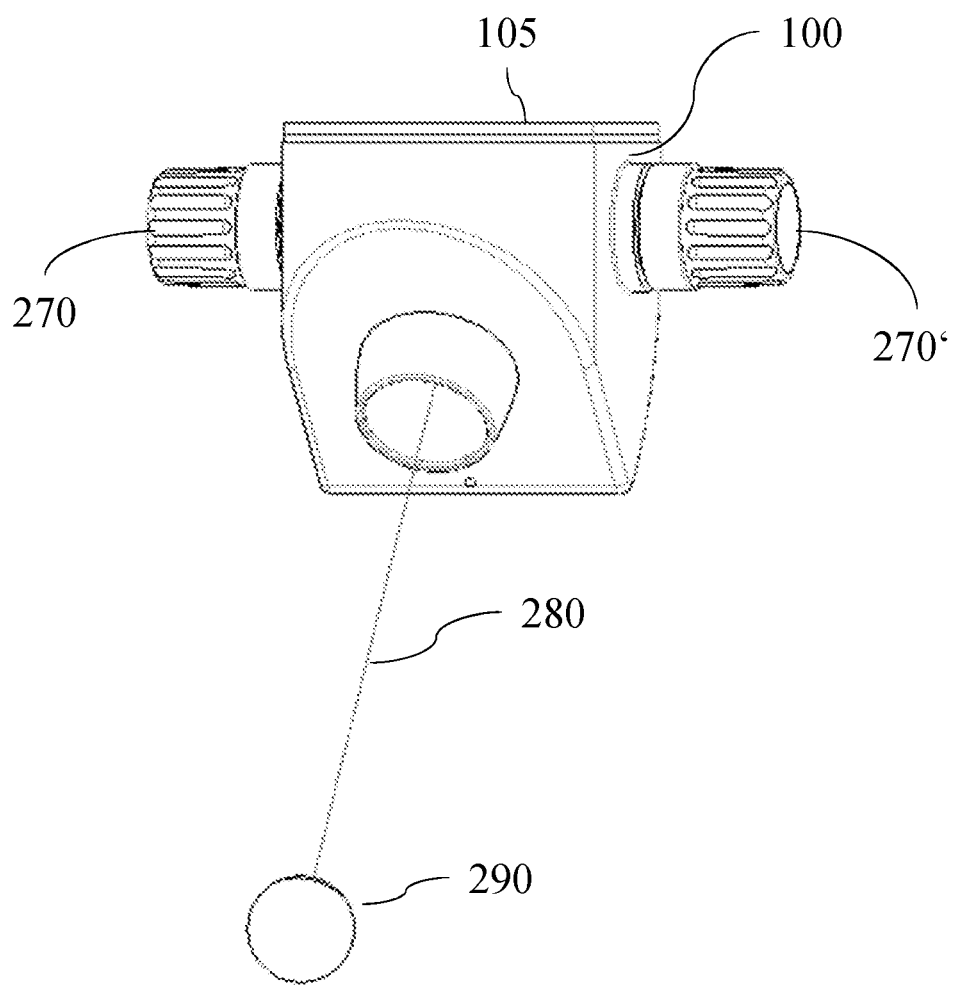
FIG. 6 shows a perspective illustration of the example embodiment of a switching unit following integration in a slit projector.

FIG. 6 shows a perspective illustration of the example embodiment of a switching unit 200 following integration in a slit projector 100 (with housing). On the upper side of the housing of the compact slit projector 100 with folded optical beam path 280 there is a mechanical interface 105, by application of which the slit projector 100 can be connected to a surgical microscope 15 by way of a positioning apparatus. The rotary knobs 270, 270' arranged on both sides are used both to adjust the position of the slit image on the eye 290 and to switch over the slit width.

Figure 7A:
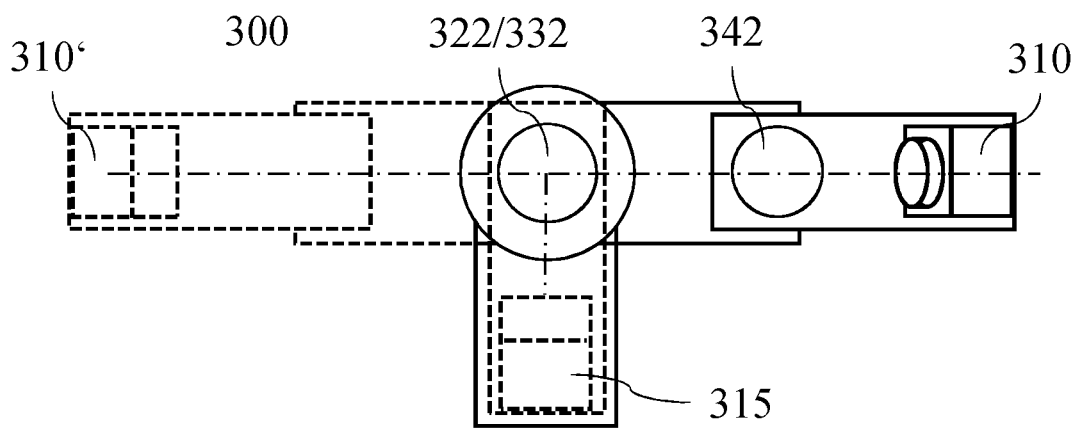
FIGS. 7a and 7b show a plan view and a side view of a schematic illustration of a first example embodiment of a positioning apparatus.
Figure 7B:
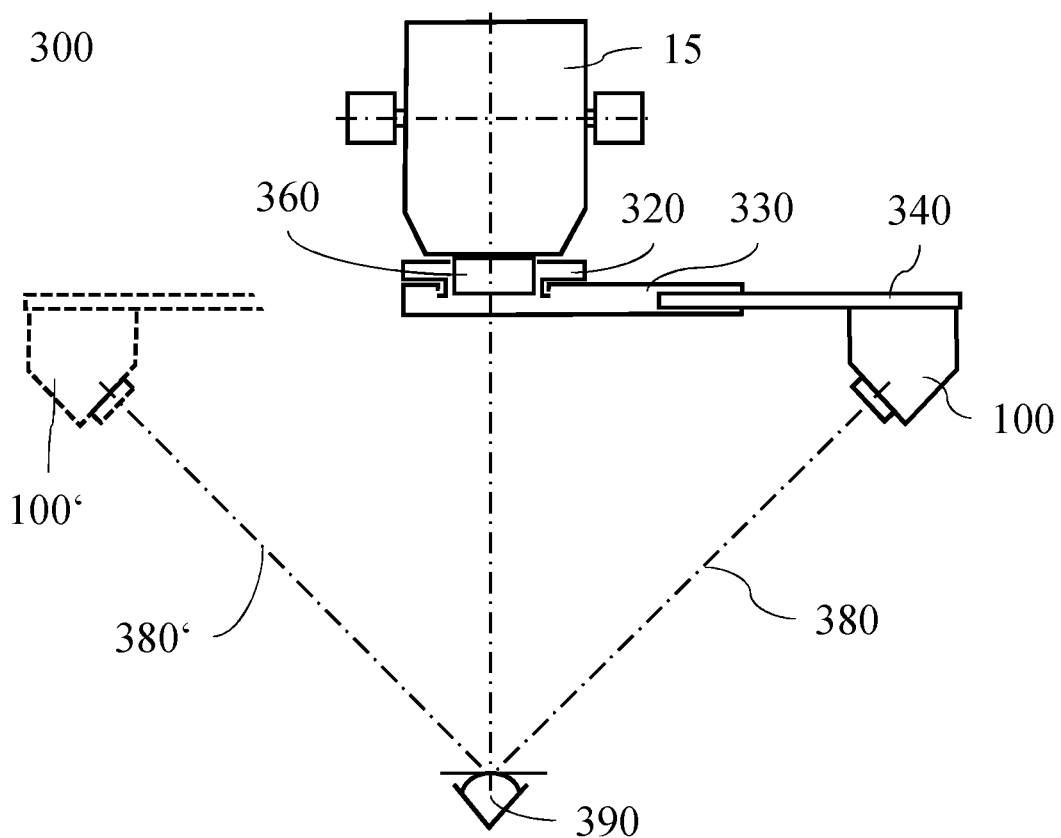

FIGS. 7a and 7b show a plan view and a side view of a schematic illustration of a first example embodiment of a positioning apparatus 300. The mechanism of the positioning apparatus 300 realizes three positions of the slit projector 100 in relation to a surgical microscope 15: a parked position (center) 315, a first work position (right; illustrated using solid lines) 310 and a second work position (left, illustrated using dashed lines and dashed reference sign) 310'.

The mechanism is fastened to an accessory interface of the surgical microscope 15 by use of a holding element 320. The holding element 320 has a pivot joint (first connection) with an axis of rotation in the main objective lens 360 of the surgical microscope 15. The pivot bearing of the pivot joint is concentric to the optical beam path of the surgical microscope 15 and has an internal diameter (cutout 322) large enough to not affect the clear diameter of the main objective lens 360 for observation and illumination. The pivot element 330 can be pivoted through ±90° by way of the pivot joint. Stops or latches are provided for the respective end positions. The pivot element 330 latches in all three positions 310, 310', 315. A slotted optocoupler as a sensor (not plotted) in the holding element 320 ensures that the illumination of the surgical microscope 15 is activated in the central position (parked position) 315 and the illumination of the LED in the slit projector 100 is deactivated. As soon as the central position (parked position) 315 is left, the surgical microscope illumination is deactivated and the LED illumination of the slit projector 100 is activated.

Once the pivoting element 330 has reached one of the two end positions (work positions) 310, 310' and rests against the stop, it is possible to extend the fastening element 340 with the slit projector 100 fastened thereto. In this case, the fastening element of 340 is in the form of a "drawer". Thus, the second connection of the positioning apparatus 300 for connecting pivoting element 330 and fastening element 340 is embodied here as a system of "guide" and "drawer". The extended positions likewise have a stop with a latch. The position of the stop is dimensioned such that the optical axis of the slit projector 100 in the two work positions 310, 310' is directed at the patient's eye 390.

In the two work positions 310, 310', the slit projector 100 is in the correct position (orientation and distance) relative to the patient's eye 390 and the LED illumination of the slit projector 100 is activated.

After using the slit projector 100, the drawer (fastening element) 340 can be retracted again, up to an inner stop. The slit projector 100 can then be pivoted back into the central position (parked position) 315 by operation of a pivot joint (first connection) between pivoting element 330 and holding element 320. The slotted optocoupler detects this position, and reactivates the illumination of the surgical microscope 15 and deactivates the LED of the slit projector 100.

The mechanism for pivoting and sliding may be equipped with a lock that prevents the slit projector 100 being pivoted in the extended state, in the case of which there is a risk of colliding with the surrounding housing parts. This lock is designed such that it ensures that the sliding joint (second connection) can only be actuated in the lateral positions (work positions) 310, 310' while, at the same time, the pivot joint (first connection) is locked in these two positions 310, 310'. Alternatively, these locks may also be embodied for a base position of the work positions 310, 310' for latching purposes, which are quickly reachable for the operator and from which, however, it is possible for example to carry out a slight displacement of the slit projector 100 and hence of the slit image in the eye 390.

The holding element 320, the pivoting element 330 and the fastening element 340 each have cutouts 322, 332 and 342. These are designed such that they do not affect the beam path of the surgical microscope if the positioning apparatus 300 is in one of the work positions 310, 310' or in the parked position 315.

In accordance with the embodiment according to the first example embodiment of the positioning apparatus 300, the slit projector 100 can be used only in the work positions 310, 310'. The distance to the patient's eye 390 is only correct in the end positions (work positions) 310, 310' and the slit is imaged in focus on (or into) the patient's eye 390. That is to say other angle positions of the slit projector 100 with respect to the eye 390 can only be realized if the imaging optical unit 160, 260 of the slit projector 100 is focused on the new distance.

To avoid this, it is advantageous for example to pivot the slit projector 100 along an arc around the eye 390, the center of said arc being located precisely at the focus of the imaging optical unit 160 of the slit projector 100. This is realized in a second example embodiment of a positioning apparatus 300, which is illustrated schematically in a side view in FIG. 8. What is advantageous in turn in the example solution shown here is the small structure in the pivoted-in state (parked position) 315 and how the surgical microscope beam path remains clear, as ensured by a 3-part construction (320, 330, 340) including cutouts.

The positioning apparatus 300 is fastened to the accessory interface of the surgical microscope 15 by way of the holding element 320. Likewise located on the holding element 320 there is a pivot bearing (first connection) with the same functionality as in the first example embodiment (FIGS. 7a and 7b). In this case, the pivoting element 330 is in the form of an arc, the radius of which corresponds to the focal distance of the imaging optical unit 160 in the slit projector 100 (while taking account of the installation height of the slit projector 100). An arcuate guide (part of the second connection) which has the same radius as the pivoting element 330 has been inserted into the pivoting element 330. This guide allows the fastening element 340 (embodied as an arcuate segment), to which the slit projector 100 has been fastened, to be extended. The arcuate guide has a stop in the end position which corresponds to the greatest mechanically possible illumination angle. Should the operator want a smaller illumination angle, the slit projector 100 with the fastening element 340 can be pivoted inward in the direction of the surgical microscope 15. To maintain the set angle position a braking apparatus has been added, the latter having to be manually released to move the fastening element 340 and automatically holding the set position after having been let go. The smallest possible illumination angle depends on the arcuate guide coverage and the segment length.

In an alternative to the fixed stops in the two described example embodiments of a positioning apparatus 300, the latches of the stops may also be designed such that they only set a base position of the work positions 310, 310' for the surgeon, who is able to displace the slit projector 100 from said work positions in order to displace the slit over the eye 390.

Furthermore, the slit projector 100 may be fastened to the described embodiments of the fastening elements 340 in a fixed or else rotatable manner in order to move the slit image over the eye 390.

Figure 8:
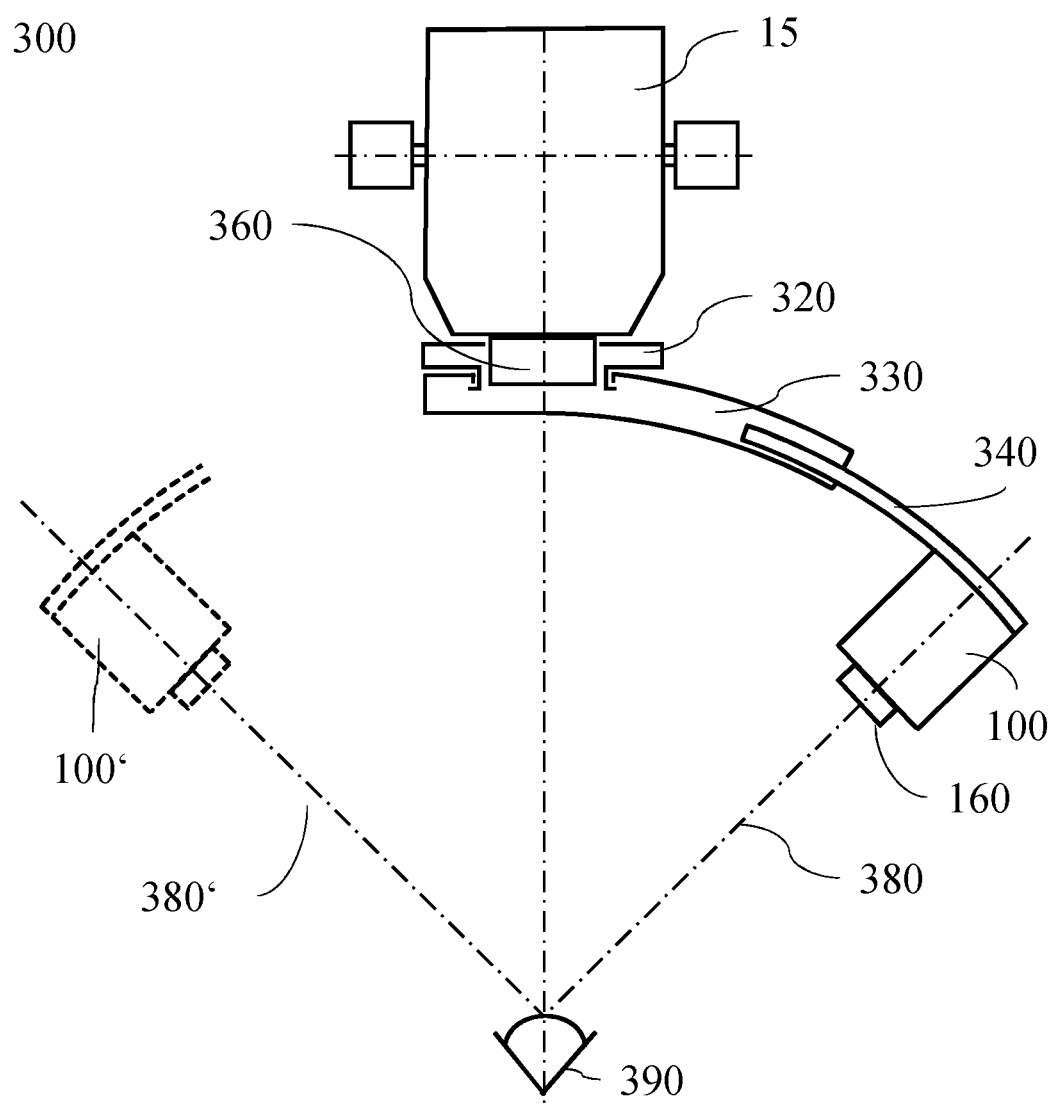
FIG. 8 shows a side view of a schematic illustration of a second example embodiment of a positioning apparatus.

The cutouts 322, 332, 342 on the holding element 320, pivoting element 330 and fastening element 340 are not plotted in FIG. 8.

Figure 9C:
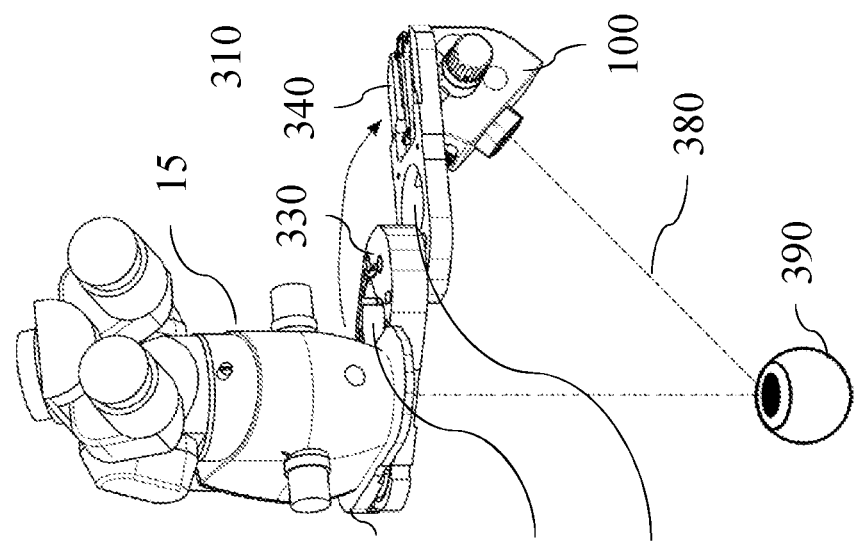
FIGS. 9a, 9b and 9c show perspective views of a third example embodiment of a positioning apparatus.
Figure 9B:
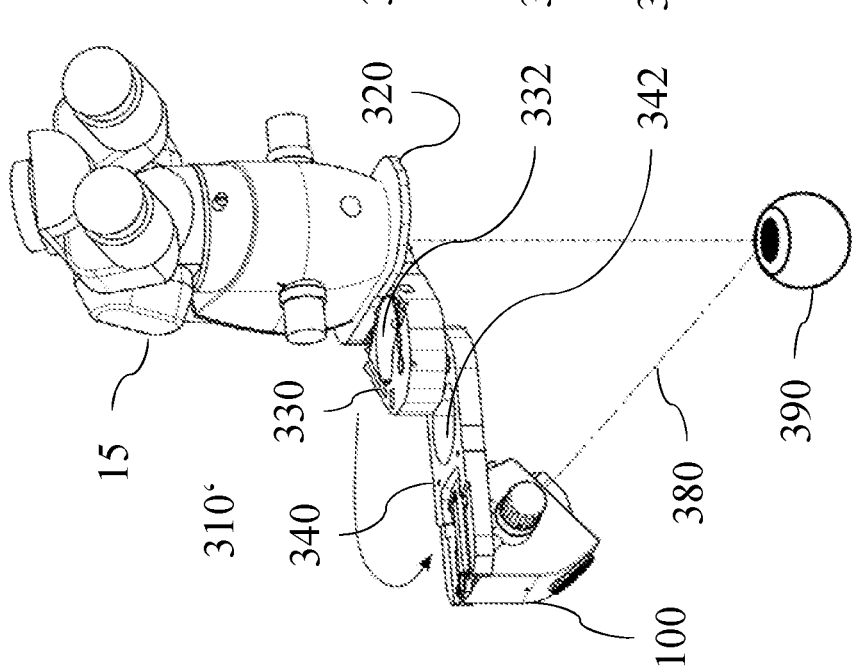
Figure 9A:
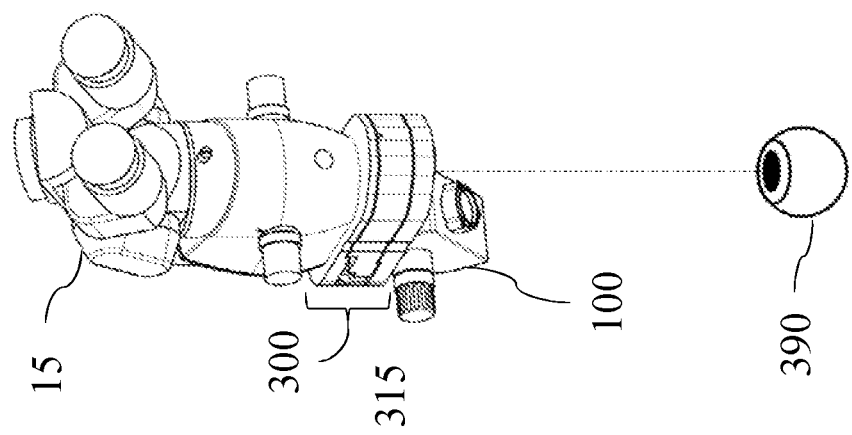

FIGS. 9a, 9b and 9c show perspective views of a third example embodiment of a positioning apparatus 300. Additionally, a surgical microscope 15 and a slit projector 100 are illustrated there, the positioning apparatus 300 being connected to these, and also a patient's eye 390 and the beam path 380 of the slit projector 100 and the beam path of the surgical microscope 15.

This embodiment is a further solution to the problem of firstly realizing a large lateral distance (for a large angle) between the slit projector 100 and optical axis of the surgical microscope 15 in the work positions 310, 310' and of secondly having a compact form in the parked position 315 and of not affecting the beam path of the surgical microscope 15. However, in this embodiment—deviating from the two above-described example embodiments—a pivot joint as a first connection is embodied with its pivot axis not being concentric with the optical beam path of the surgical microscope 15.

The parked position 315 shown in FIG. 9a is particularly space-saving and hardly wider and deeper than the main body of the surgical microscope 15.

The work positions (to the left of 310' or to the right 310 of the parked position 315, in order to be able to work at different illumination angles) are illustrated in FIG. 9b and FIG. 9c and have a large distance from the optical axis of the surgical microscope 15. This realizes grazing illumination, which is advantageous for example for monitoring following the refractive treatment.

Figure 10:
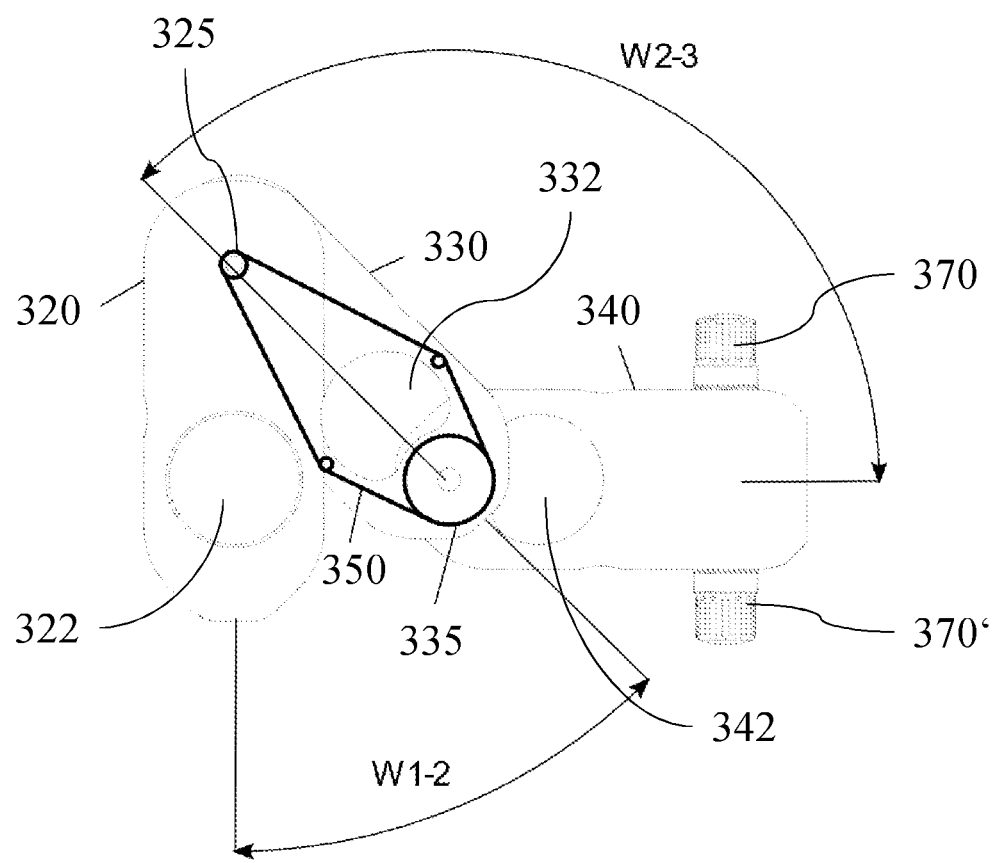
FIG. 10 shows a plan view of a schematic illustration of a variant of the third example embodiment of a positioning apparatus.

FIG. 10 shows the plan view of a schematic illustration of a variant of the third example embodiment of a positioning apparatus 300. Here, this is an embodiment of the 3-member positioning apparatus 300 with a synchronizing mechanism.

When pivoting out the slit projector 100 (only the operating elements 370, 370' are plotted here) that is fastened to the fastening element 340 there is an automatic synchronization of the movement of the pivoting element 330. This facilitates a targeted movement which significantly improves the operability.

To this end:
- a first pulley 325 is fastened to the holding element 320,
- a second pulley 335 is fastened to the fastening element 340 which carries the slit projector 100,
- the pulleys 325, 335 are connected to one another by traction structures 350 (e.g., toothed belt, rope), and
- the diameter ratio D325/D335 (ratio of the diameter the first pulley 325 to that of the second pulley 335) is the same as the ratio of the pivot angles W1–2/W2–3.

Furthermore, the pivoting mechanism and additional stops ensure that the fastening element 340 is at an angle of 90° (work positions 310, 310') with respect to the holding element 320 after having been pivoted out. The fastening element 340 may contain guide rails, by operation of which the fastening element 340 including the slit projector 100 fastened thereto, may be displaced to the holding element 320 such that the slit image moves over the eye 390.

According to the invention, the positioning apparatus 300 therefore has two points of rotation (centers of the pulleys 325 and 335) and two pivotable members (pivoting element 330, fastening element 340).

Alternatively, the positioning apparatus 300 may be designed such that the pivoting element 330 and the fastening element 340 are located on a common axis in the pivoted-out state. In this case, the guide rail on the fastening element 340 for moving the slit projector 100 is once again arranged at 90° with respect to the holding element 320 such that the slit image once again moves over the eye.

In this case, the aforementioned features of the invention, which are described in various example embodiments, can be used not only in the specified example combinations but also in other combinations or on their own, without departing from the scope of the present invention.

The invention claimed is:

1. A slit projector illumination source that facilitates examining an eye, including for an ophthalmological therapy system, the slit projector producing a slit illumination in a tissue of the eye, the slit projector comprising:
   a light source that provides light illuminating a slit shaper;
   the slit shaper and illumination optics located along a beam path, the illumination optics projecting an image of the slit shaper into the tissue of the eye to produce the slit illumination of the tissue of the eye;
   the slit projector further comprising a mirror which is arranged in the beam path between the slit shaper and the illumination optics; and
   wherein the illumination optics have a magnification that magnifies the image of the slit shaper projected into the tissue of the eye selected from a group consisting of between 1 and 5, between 1.5 and 3 and more than 1.5 and less than 2.

2. The slit projector as claimed in claim 1, wherein the slit projector comprises a second mirror, the second mirror being arranged in the beam path between the slit shaper and the imaging optics.

3. The slit projector as claimed in claim 2, wherein light impinges on one of the first mirror and the second mirror in the beam path two times in succession.

4. The slit projector as claimed in claim 1, wherein a reflection angle of the beam path at the mirror is an angle selected from a group consisting of less than 90°, less than or equal to 60° and less than or equal to 45°.

5. The slit projector as claimed in claim 1, wherein the mirror is movable and consequently is configured to tilt the beam path.

6. The slit projector as claimed in claim 1, wherein the slit shaper modifies a slit width.

7. The slit projector as claimed in claim 1, wherein the slit projector further comprises an aperture shaper that variably trims the beam path in an aperture.

8. The slit projector as claimed in claim 1, wherein the slit projector further comprises an attenuator that variably attenuates the light provided by the light source.

9. The slit projector as claimed in claim 1 wherein the slit shaper modifies a slit width and wherein the slit projector further comprises an aperture shaper that variably trims the beam path in an aperture or wherein the slit projector further comprises an attenuator that variably attenuates the light provided by the light source,
   wherein the attenuator and the slit shaper and/or the aperture shaper are designed, in the case of a modification of the slit width and/or a change in the trim of the aperture, to attenuate the light provided by the light source, so that a luminous flux at the eye remains constant to a tolerance selected a group consisting of within ±30%, within ±15% and to within ±10%.

10. A positioning apparatus for an ophthalmological therapy system comprising a surgical microscope, which has a work location, and comprising a slit projector that provides slit illumination, the positioning apparatus aligning the slit illumination in a tissue of an eye located proximate the work location,
   the slit projector facilitating examining the eye and producing the slit illumination in the tissue of the eye, the slit projector comprising:
      a light source that provides light illuminating a slit shaper;
      the slit shaper and illumination optics located along a beam path, the illumination optics projecting an image of the slit shaper into the tissue of the eye to produce the slit illumination of the tissue of the eye; and
      a mirror which is arranged in the beam path between the slit shaper and the illumination optics;
   the positioning apparatus comprising:
      a holding element which is configured to be connected to the surgical microscope,
      a fastening element which is configured to be connected to the slit projector, and
      a pivoting element which has a first connection, by use of which the pivoting element is movably connected to the holding element, and which has a second connection, by operation of which the pivoting element is movably connected to the fastening element; and
   the positioning apparatus being configured to move the fastening element between two different positions in relation to the holding element, the slit illumination being aligned on the work location in both positions;

whereby the pivoting element is movably connected with respect to the holding element and whereby the fastening element is movably connected with respect to the pivoting element thereby facilitating projecting the image of the slit shaper into the tissue of the eye to produce the slit illumination of the tissue of the eye.

11. The positioning apparatus as claimed in claim 10, wherein the fastening element is movable into a third position, which differs from the first and the second position, in relation to the holding element, and the extent of the positioning apparatus being smaller in said third position than in the first and second positions.

12. The positioning apparatus as claimed in claim 10, wherein the surgical microscope has a beam path between a surgical microscope optical unit and the eye, wherein at least one of the holding element, the pivoting element and the fastening element have a cutout, the cutout being structured not to affect the beam path when the positioning apparatus is in the first, second and third position.

13. The positioning apparatus as claimed in claim 10, wherein the first connection is in the form of a rotary connection, wherein the second connection is in the form of a rotary connection or sliding connection or a combination of the foregoing.

14. The positioning apparatus as claimed in claim 10, wherein the first and the second connection are in the form of rotary connections, wherein axes of rotation of the first and the second connection are parallel and wherein the first and the second connection are coupled by a coupling element.

15. The positioning apparatus as claimed in claim 10, wherein at least one of the fastening elements and the pivoting element are embodied as an arcuate segment.

16. The positioning apparatus as claimed in claim 10, wherein the first connection has a stop which restricts a movement between pivoting element and holding element, the second connection has a stop which restricts a movement between pivoting element and fastening element or both.

17. The positioning apparatus as claimed in claim 10, wherein the positioning apparatus comprises an electrical interface to the surgical microscope and an electrical interface to the slit projector, and wherein an electrical line is integrated that communicates electric or electronic signals between the two electrical interfaces.

18. The positioning apparatus as claimed in claim 10, further comprising at least one of a sensor that detects a relative position between the fastening element and the pivoting element and a sensor that detects a relative position between the holding element and the pivoting element.

\* \* \* \* \*